United States Patent [19]
Tamura

[11] Patent Number: 5,566,309
[45] Date of Patent: Oct. 15, 1996

[54] VARIABLE MEMORY BOUNDARIES BETWEEN EXTERNAL AND INTERNAL MEMORIES FOR SINGLE-CHIP MICROCOMPUTER

[75] Inventor: Toshinori Tamura, Tokyo, Japan

[73] Assignee: NEC Corporation, Japan

[21] Appl. No.: 976,218

[22] Filed: Nov. 13, 1992

[30] Foreign Application Priority Data

Nov. 13, 1991 [JP] Japan .................................. 3-296879

[51] Int. Cl.⁶ .................................................. G06F 12/00
[52] U.S. Cl. ........................... 395/405; 395/402; 395/411
[58] Field of Search ...................................... 395/425, 400, 395/402, 405, 411, 490, 492

[56] References Cited

U.S. PATENT DOCUMENTS

| | | | |
|---|---|---|---|
| 3,651,475 | 3/1979 | Dunbar, Jr. et al. | 395/405 |
| 4,393,443 | 7/1983 | Lewis | 395/417 |
| 4,432,067 | 2/1984 | Nielsen | 364/410 |
| 4,485,457 | 11/1984 | Balaska et al. | 395/405 |
| 4,521,853 | 6/1985 | Guttag | 395/490 |
| 5,093,909 | 3/1992 | Saito | 395/488 |
| 5,222,226 | 6/1993 | Yamaguchi et al. | 395/412 |

*Primary Examiner*—Jack A. Lane
*Attorney, Agent, or Firm*—Whitham, Curtis, Whitham & McGinn

[57] ABSTRACT

A microcomputer according to the present invention is provided with a memory space judgment device to judge whether an access to a memory by the central processing unit is for the internal memory or the external memory. The memory space judgment device has a memory space switching flag serving as a boundary address change mechanism so that the boundary address between the memory mapping region for the internal memory and the memory mapping region for the external memory can be changed by changing the values at the flag. Thus, the region assigned to the internal memory space can be changed to the external memory space, or the region assigned to the external memory space to the internal memory space.

6 Claims, 5 Drawing Sheets

FIG. 5A
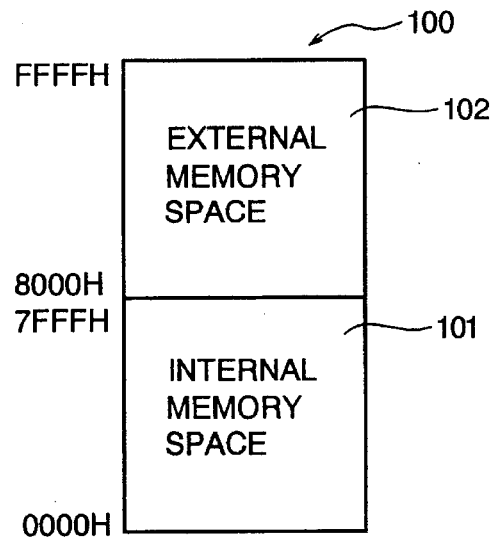
FIG. 5B
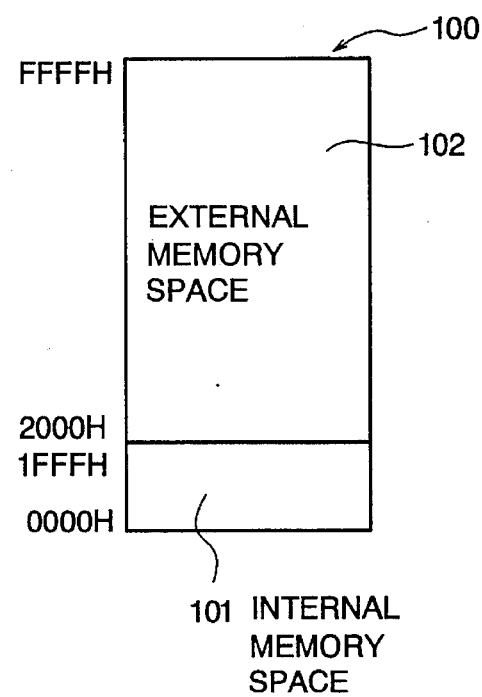
FIG. 6
| VALUES FOR BOUNDARY SETTING FLAG | | | INTERNAL MEMORY CAPACITY |
|---|---|---|---|
| 0 | 0 | 0 | SETTING DISABLED |
| 0 | 0 | 1 | 8K BYTE |
| 0 | 1 | 0 | 16K BYTE |
| 0 | 1 | 1 | 24K BYTE |
| 1 | 0 | 0 | 32K BYTE |
| 1 | 0 | 1 | 40K BYTE |
| 1 | 1 | 0 | 48K BYTE |
| 1 | 1 | 1 | 56K BYTE | ns
VARIABLE MEMORY BOUNDARIES BETWEEN EXTERNAL AND INTERNAL MEMORIES FOR SINGLE-CHIP MICROCOMPUTER

BACKGROUNDS OF THE INVENTION

1. Field of the Invention

The present invention relates to a microcomputer which can access an external memory, and particularly relates to a single-chip microcomputer for which the boundary address of the memory mapping boundary between internal and external memories can be set by software programming.

2. Description of the Prior Art

With application products using single-chip microcomputers becoming more sophisticated recently, the single-chip microcomputer itself is increasingly required to have higher capabilities with much greater program size.

A single-chip microcomputer usually has an incorporated memory inside, where a program is written during diffusion process, so that the microcomputer executes processing according to the program written there. Because of an increase in program size and data amount to meet the requirement for higher function and performance, a recent single-chip microcomputer is often provided with an additional memory storing programs and data connected outside. In this case, the incorporated memory (internal memory) is mapped to a certain address region in the memory space and the memory connected outside (external memory) is mapped to an address region different from the one where the internal memory is mapped. They can be accessed with specification of the mapped address. The internal and external memory spaces are generally on both sides of their boundary address and mapped so as to have continuous addresses.

In a conventional single-chip computer, the boundary address between the space for internal memory mapping and the space for external memory mapping is fixed. This means that the maximum accessible memory space cannot be changed from the size obtained by the internal memory capacity and the external memory capacity. In other words, the memory space cannot be easily extended in response to increase in program size and data amount.

SUMMARY OF THE INVENTION

It is an object of the present invention to provide a microcomputer with a capability of changing the address of the boundary between the internal memory and the external memory so as to practically extend the memory space by changing the region used for internal memory mapping to that for the external memory mapping or the region used for external memory mapping to that for the internal memory.

According to a preferred embodiment of the present invention to attain the object above, a microcomputer comprises a central processing means, an internal memory to store programs and data, an external memory connected via an external interface and a memory space judgment means which judges whether an access to a memory by the central processing means is for the internal memory or the external memory, and the memory space judgment means further comprises a boundary address change means to change the address of the boundary separating the memory mapping region for the internal memory and that for the external memory.

According to a further preferred embodiment, the memory space judgment means further comprises a comparison means which performs a certain operation using the values from the boundary address change means, the address data values specified in the access by the central processing means and the values at the flags and outputs the judgment signal to indicate whether the access is for the internal memory or the external memory.

According to a still further preferred embodiment, the boundary address change means comprises a flag whose value can be changed by the central processing means through software operation and changes the boundary address to either of two predetermined settings according to the value at the flag.

According to another preferred embodiment, the comparison means of the memory space judgment means receives as input data the three most significant bits of the address data (X3, X2, X1), the value (Y1) of the boundary address changing means, the logical product "0" (Y2) and the value (Y3) as the logical product of the value obtained by inverting the value from the boundary address change means and the logical value "1", performs operation according to the formula (X3-Y3)2(X2-Y2)2(X1-Y1)2, and outputs the judgment signal to instruct accessing to the internal memory when the operation result is negative, and the signal for accessing to the external memory when the result is zero or positive.

According to still another preferred embodiment, the address change means comprises three flags whose values can be changed by the central processing means through software operation and sets the boundary address to one of seven settings according to the values at the flags.

Further, the comparison means receives as input the three most significant bits (X3, X2, X1) of the address data and the values (Y3, Y2, Y1) from the boundary address change means, performs operation according to the formula (X3-Y3)2(X2-Y2)2(X1 Y1)2, and outputs the judgment signal to instruct accessing to the internal memory when the operation result is negative and the signal to instruct accessing to the external memory when the result is zero or positive.

Other objects, characteristics and effects of the present invention will be clarified in the detailed description below.

BRIEF DESCRIPTION OF THE DRAWINGS

FIGS. 5A and 5B are a diagram to show the memory space where internal and external memories in the second embodiment as shown in FIG. 4 are mapped; and FIG. 6 is a diagram to show the relation between the values at the boundary setting flag and the internal memory capacity in the second embodiment as shown in FIG. 4.

DESCRIPTION OF THE PREFERRED EMBODIMENT

Figure 1:
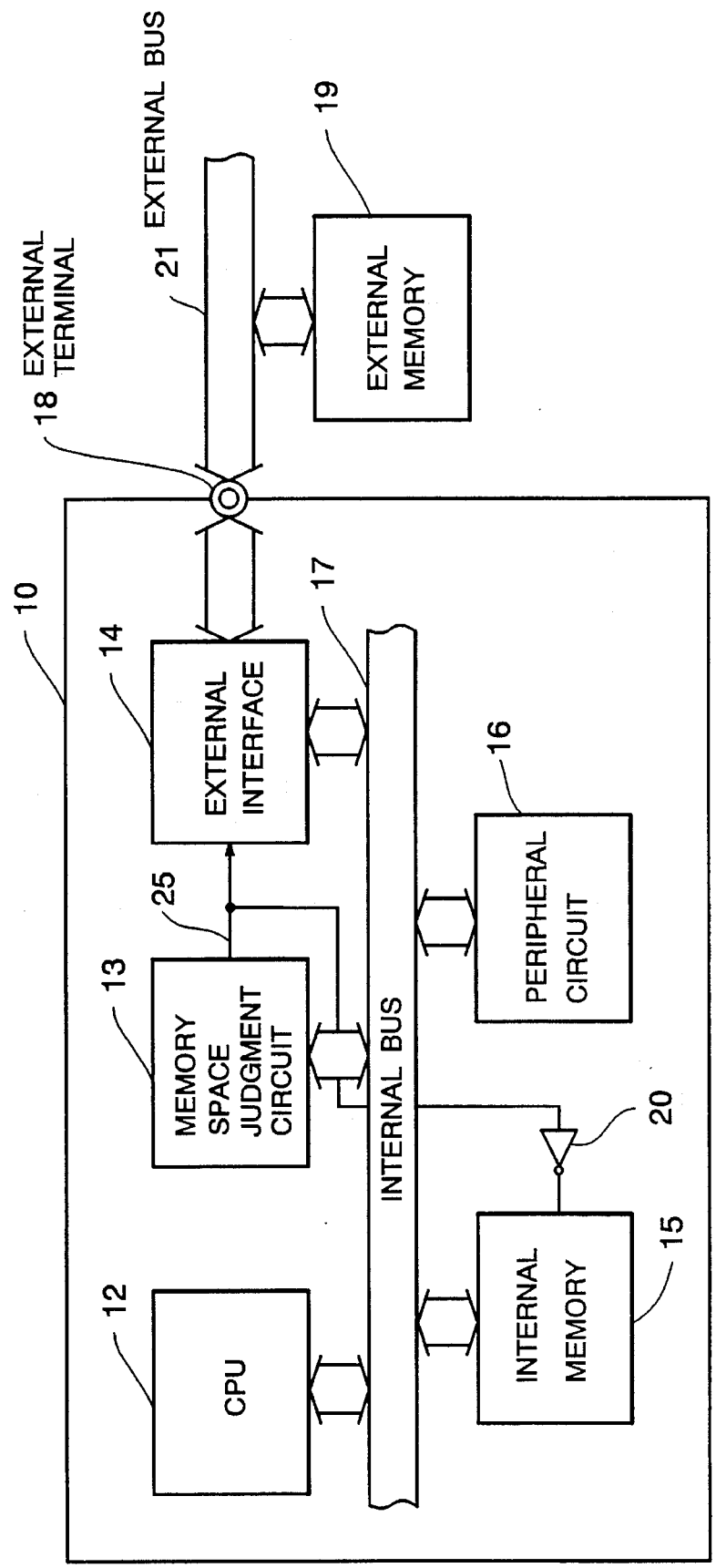
FIG. 1 is a block diagram to show the configuration of a microcomputer according to a first embodiment of the present invention.

Referring to the attached figures, preferred embodiments of a microcomputer according to the present invention will be described below. FIG. 1 is a block diagram to show the configuration of a single-chip microcomputer according to the present invention.

Referring to FIG. 1, a microcomputer 10 according to the present invention comprises a central processing unit (CPU) 12, a memory space judgment circuit 13, an external interface 14, an internal memory 15, a peripheral circuit 16 and an internal bus 17. It is also connected with an external memory 19 via an external terminal 18 and an external bus 21.

The memory space judgment circuit 13 judges whether the address accessed by the CPU 12 is the address where the internal memory 15 is mapped or the address where the external memory 19 is mapped. A judgment signal 25, which is an output signal from the memory space judgment circuit 13, is supplied to the external interface 14 and, via an inverter gate 20, to the internal memory 15.

When the memory space judgment circuit 13 judges that the CPU 12 is accessing the address where the external memory 19 is mapped, it outputs the judgment signal 25 with the logical value "1". When it judges that the internal memory 15 is mapped to that address, then it outputs the judgment signal 25 with the logical value "0".

When the judgment signal 25 from the memory space judgment circuit 13 is "0", i.e. the output from the inverter gate 20 is "1", the internal memory 15 outputs the data at the specified address to the internal bus 17. The external interface 14 is provided for access to the external memory 19 via the external terminal 18 and the external bus 21 when the judgment signal 25 is "1". The external memory 19 outputs the data at the specified address to the external bus 21 when the judgment signal 25 is "1".

Figure 2:
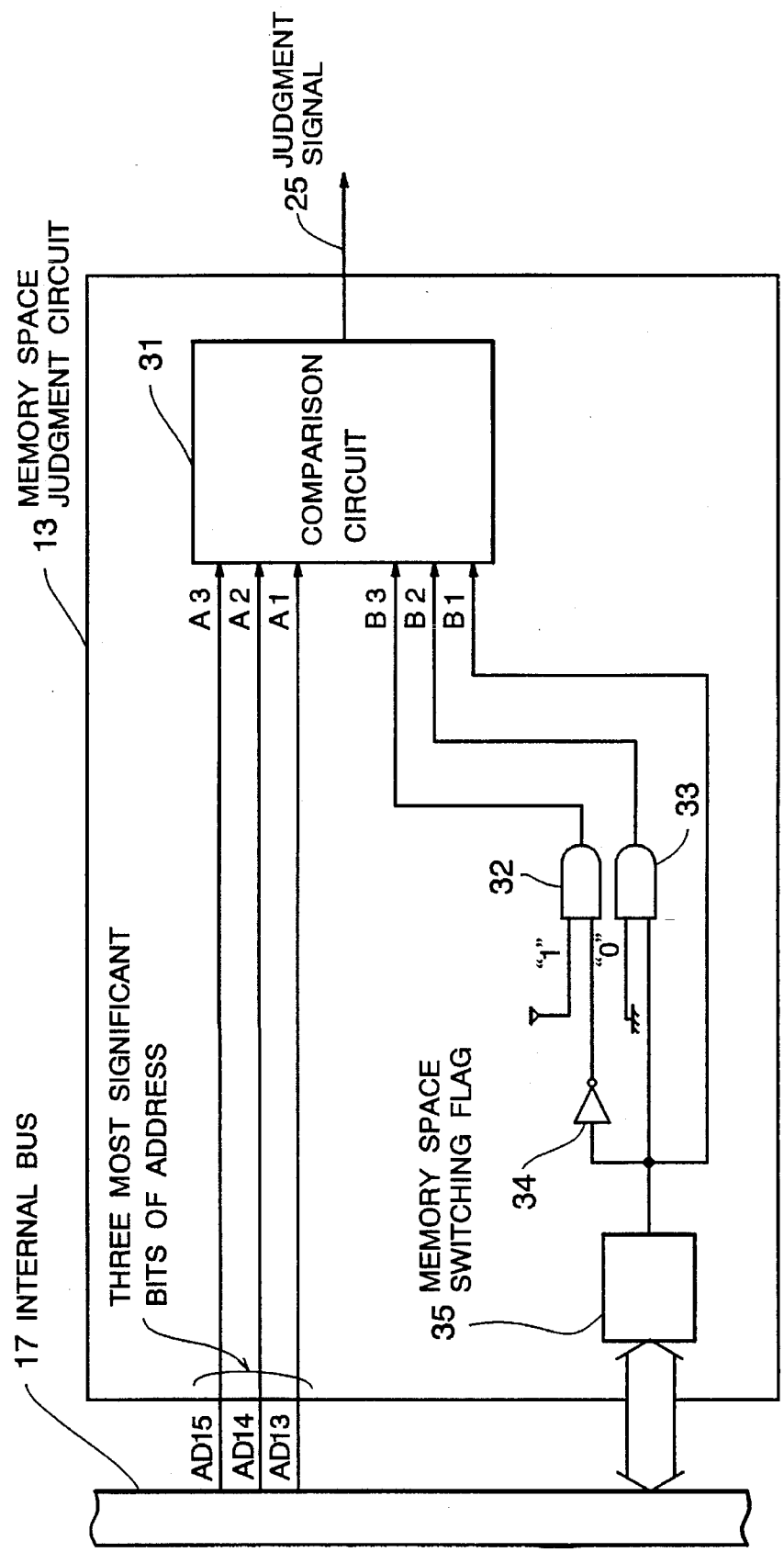
FIG. 2 is a block diagram to show the configuration of a memory space judgment circuit for the microcomputer shown in FIG. 1.

FIG. 2 is a block diagram to show the configuration in detail of the memory space judgment circuit 13 above. As shown in the figure, the memory space judgment circuit 13 is provided with a comparison circuit 31, which outputs the judgment result as the judgment signal 25. It is further provided with a memory space switching flag 35, AND gates 32 and 33 and an inverter gate 34. The memory space switching flag 35 is to change the boundary address between the space for the internal memory 15 and that for the external memory 19.

The memory space switching flag 35 is connected with the internal bus 17 and its value is set through software operation from the CPU 12. The comparison circuit 31 has two groups of inputs. The first group of inputs A3, A2 and A1 receive the three consecutive bits beginning from the most significant bit of the address sent via the internal bus 17. In this embodiment, an address is supposed to have 16 bits (with the least significant bit AD0 and the most significant bit AD15), and the bits AD15, AD14 and AD13 are input to the inputs A3, A2 and A1 at the comparison circuit 31.

The second group of inputs B3, B2 and B1 at the comparison circuit 31 receive outputs from the AND gate 32, the AND gate 33 and the memory space switching flag 35 respectively. The AND gate 32 always receives a logical value "1" at one of its inputs and at the other input receives the output from the space switching flag 35 sent through the inverter gate 34. The AND gate 33 always receives a logical value "0" at one of its inputs, and at the other input receives the output from the space switching flag 35.

For the above inputs A3, A2 and A1 as well as inputs B3, B2 and B1, the comparison circuit 31 performs weighted subtraction for three bits according to the following formula, and outputs the judgment signal 25 with the value "1" when the result of the operation is zero or a positive number:

$$C=(A3-B3)2^2(A2-B2)2^1(A1-B1)2^0 \quad (1)$$

where A3, A2, A1, B3, B2 and B1 are inputs at the comparison circuit 31, and C is the result of subtraction. It is supposed that the maximum memory space accessible by the microcomputer 10 is 64 kilobytes, the internal memory 15 has a capacity of 32 kilobytes, and the external memory 19 has a capacity of 32 kilobytes.

Figure 3A:
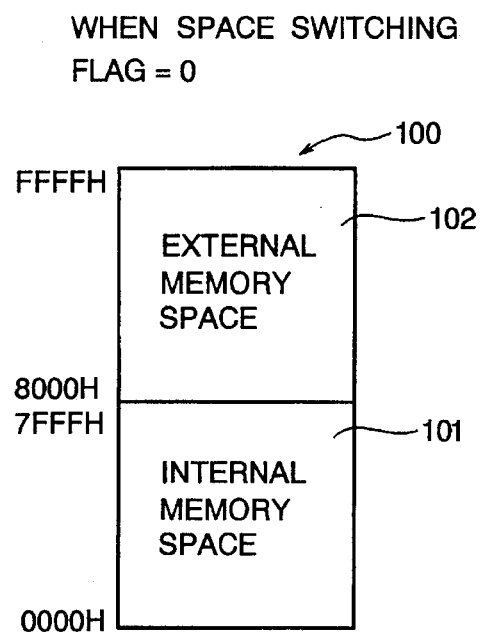
FIGS. 3A and 3B are a diagram to show the memory spaces where internal and external memories of the microcomputer shown in FIG. 1 are mapped.
Figure 3B:
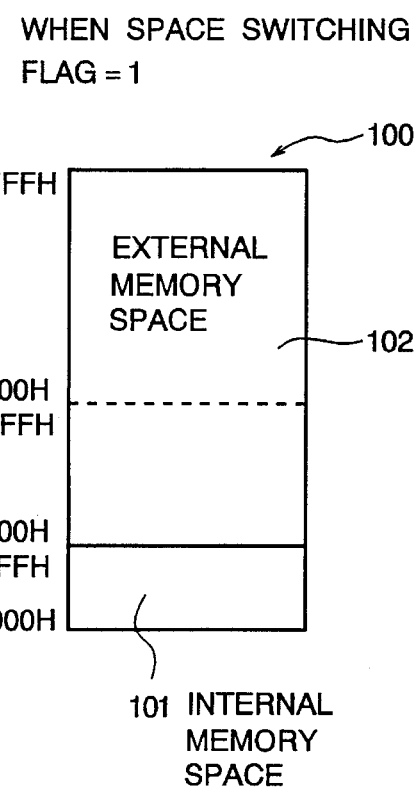

FIGS. 3A and 3B illustrate how the memories are mapped in the memory space 100 when the capacity of the internal memory space 101 is 32 kilobytes and 8 kilobytes respectively. The internal memory space 101 is an address region for mapping of the internal memory 15, and the external memory space 102 is an address region for mapping of the external memory 19.

Referring now to FIGS. 1 to 3, the access operation is described for the two cases where the memory space switching flag 35 at the memory space judgment circuit 13 has "0" and "1" respectively.

Firstly, it is supposed that the memory space switching flag 35 is set to have "0".

The value "0" is set at the space flag 35 at the memory space judgment circuit 13 through processing at the CPU 12. Since the memory space switching flag 35 has "0", the output from the inverter gate 34 is "1", the output from the AND gate 32 is "1", and the output from the AND gate 33 is "0". Accordingly, the comparison circuit 31 receives "1" at the input B3, "0" at the input B2 and "0" at the input B1.

Suppose now that the CPU 12 accesses the address "7FFFH". When the CPU 12 accesses the address "7FFFH", since the three most significant bits AD15, AD14 and AD13 are "0", "1" and "1" respectively, the comparison circuit 31 receives "0" at the input A3, "1" at the input A2 and "1" at the input A1. In short, the comparison circuit 31 receives (0,1,1) at the inputs A3, A2 and A1 and (1,0,0) at the inputs B3, B2 and B1.

The comparison circuit 31 performs operation according to the above formula (1) using the values at the inputs A3 to A1 and B3 to B1. In this case, the operation result becomes negative and the comparison circuit 31 outputs "0" as the judgment signal 25.

Since the judgment signal 25 is "0", the external interface 14 does not operate. The value "1" at the output from the inverter gate 20 turns on the internal memory 15. This causes the data stored at the address "7FFFH" in the internal memory 15 to be output, and read by the CPU 12. If the CPU 12 accesses with specifying an address smaller than the address "7FFFH", the operation result at the comparison circuit 31 becomes negative as described above and the judgment signal 25 becomes "0", and the data at the specified address in the internal memory 15 is read.

Suppose now that the CPU 12 accesses the address "8000H". When the CPU 12 accesses the address "8000H", since the three most significant bits AD15, AD14 and AD13 are "1", "0" and "0" respectively, the comparison circuit 31 receives "1" at the input A3, "0" at the input A2 and "0" at the input A1. In short, the comparison circuit 31 receives (1,0,0) at the inputs A3, A2 and A1 and (1,0,0) at the inputs B3, B2 and B1.

The comparison circuit 31 performs operation according to the above formula (1) using the values at the inputs A3 to A1 and B3 to B1. In this case, the operation result is 0 and the comparison circuit 31 outputs "1" as the judgment signal 25.

Since the judgment signal 25 is "1", the external interface 14 is activated and the data stored at the address "8000H" in the external memory 19 is output via the external terminal 18 and the external bus 21. Since the output from the inverter gate 20 becomes "0" in this case, the internal memory 15 does not output any data. This causes the CPU 12 to access the external memory 19 for the data at the address "8000H". If the CPU 12 accesses with specifying an address larger than the address "8000H", the operation result at the comparison circuit 31 becomes zero or positive with the judgment signal 25 having "1" as described above, and the data at the specified address in the external memory 19 is read.

Thus, when the memory space switching flag 35 has "0", the memory space 100 has memory mapping as shown in FIG. 3A. Specifically, the internal memory space 101 (address region) from "0000H" to "7FFFH" is used for mapping of the internal memory 15, and the external memory space 102 (address region) from "8000H" to "FFFFH" is used for mapping of the external memory 19. The boundary separating the internal memory space 101 and the external memory space 102 is "7FFFH" ("8000H"). As a result, an address region corresponding to a capacity of 32 kilobytes for the internal memory 15 and the external memory 19 can be used for mapping as the internal memory space 101 and the external memory space 102.

Secondly, it is supposed that the memory space switching flag 35 is set to have "1".

The value "1" is set at the memory space switching flag 35 at the memory space judgment circuit 13 through processing at the CPU 12. Since the memory space switching flag has "1", the output from the inverter gate 34 is "0", the output from the AND gate 32 is "0", and the output from the AND gate 33 is "0". Accordingly, the comparison circuit 31 receives "0" at the input B3, "0" at the input B2 and "1" at the input B1.

Suppose now that the CPU 12 accesses the address "1FFFH". When the CPU 12 accesses the address "1FFFH", since the three most significant bits AD15, AD14 and AD13 are "0", "0" and "0" respectively, the comparison circuit 31 receives "0" at the input A3, "0" at the input A2 and "0" at the input A1. In short, the comparison circuit 31 receives (0,0,0) at the inputs A3, A2 and A1 and (0,0,1) at the inputs B3, B2 and B1.

The comparison circuit 31 performs operation according to the above formula (1) using the values at the inputs A3 to A1 and B3 to B1. In this case, the operation result is negative and the comparison circuit 1 outputs "0" as the judgment signal 25.

Since the judgment signal 25 is "0", the external interface 14 is not activated. The output "1" from the inverter gate 20 turns on the internal memory 15. This causes the data stored at the address "1FFFH" to be output and read by the CPU 12. If the CPU 12 accesses with specifying an address smaller than the address "7FFFH", the operation result at the comparison circuit 31 becomes negative with the judgment signal 25 having "0" as described above, and the data at the specified address in the internal memory 15 is read.

Suppose now that the CPU 12 accesses the address "2000H". When the CPU 12 accesses the address "2000H", since the three most significant bits AD15, AD14 and AD13 are "0", "0" and "1" respectively, the comparison circuit 31 receives (0,0,1) at the inputs A3, A2 and A1 and (0,0,1) at the inputs B3, B2 and B1.

The comparison circuit 31 performs operation according to the above formula (1) using the values at the inputs A3 to A1 and B3 to B1. In this case, the operation result is zero and the comparison circuit 31 outputs "1" as the judgment signal 25.

Since the judgment signal 25 is "1", the external interface 14 is activated and the data stored at the address "2000H" in the external memory 19 is output via the external terminal 18 and the external bus 21 and read by the CPU 12. Since the output from the inverter gate 20 becomes "0" in this case, the internal memory 15 does not output any data. If the CPU 12 accesses with specifying an address larger than the address "2000H", the operation result at the comparison circuit 31 becomes zero or positive with the judgment signal 25 having "1" as described above, and the data at the specified address in the external memory 19 is read.

Thus, when the memory space switching flag 35 has "1", the memory space 100 has memory mapping as shown in FIG. 3B. The boundary separating the internal memory space 101 and the external memory space 102 is changed from the address "7FFFH" (8000H) to the address "1FFFH" (2000H). Specifically, the internal memory space 101 (address region) from "0000H" to "1FFFH" is used for mapping of the internal memory 15, and the external memory space 102 (address region) from "2000H" to "FFFFH" is used for mapping of the external memory 19.

Thus, this embodiment enables, by setting the memory space switching flag 35 to "0" or "1", mapping of a 24-kilobyte region from "2000H" to "7FFFH" to either of the internal memory space 101 or the external memory space 102. Therefore, the internal memory space 101 or the external memory space 102 may have a larger memory space keeping their addresses continued.

Figure 4:
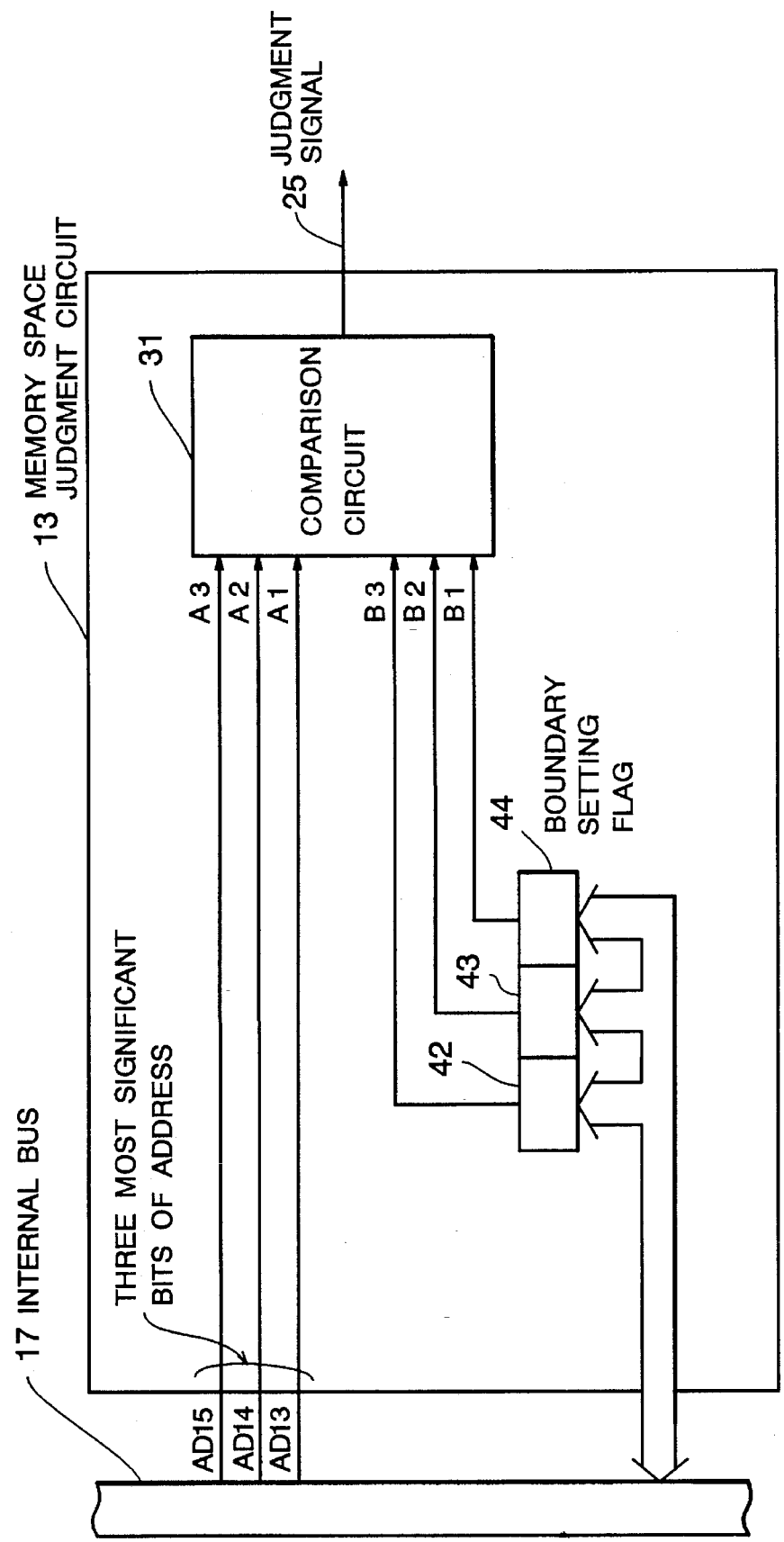
FIG. 4 is a block diagram to show the configuration of a memory space judgment circuit according to a second embodiment of the present invention.

FIG. 4 shows the configuration of a memory space judgment circuit 13 according to a second embodiment of the present invention. This memory space judgment circuit 13 is designed by deleting the memory space switching flag 35, the AND gates 32 and 33 and the inverter gate 34 from and adding boundary setting flags 42, 43 and 44 to the configuration shown in FIG. 2.

The boundary setting flags 42, 43 and 44 are connected with the internal bus 17, and their values are set through software operation at the CPU 12. The comparison circuit 31 functions in the same way as in the embodiment shown in FIG. 2.

Outputs from the boundary setting flags 42, 43 and 44 are given to the inputs B3, B2 and B1 at the comparison circuit 31.

FIGS. 5A and 5B illustrate how the memories are mapped in the memory space 100 when the capacity of the internal memory space 101 is set to 32 kilobytes and 8 kilobytes respectively. FIG. 6 shows the relation between the values set at the boundary setting flags 42, 43 and 44 and the capacity of the internal memory space 101. As shown in the figure, the boundary setting flags 42, 43 and 44 can have 7 settings excluding "0, 0, 0".

Referring to FIGS. 5 and 6, the operation of the CPU 12 when it accesses the internal memory space 101 and the external memory space 102 is described.

Suppose now that the boundary setting flags 42, 43 and 44 are given "1, 0, 0". In this case, the comparison circuit 31 has "1" at the input B3, "0" at the input B2 and "0" at the input B1. Accordingly, as described for the first embodiment, the boundary separating the internal memory space 101 and the external memory space 102 is the address "7FFFH" (8000H) and the mapping is as shown in FIG. 5A. Both of the internal memory space 101 and the external memory space 102 have a capacity of 32 kilobytes here. If the CPU 12 accesses with specifying an address smaller than "7FFFH", the judgment signal 25 from the comparison circuit 31 becomes "0" and the data at the applicable address in the internal memory 15 is read; if it accesses with specifying an address larger than "8000H", the judgment signal 25 from the comparison circuit 31 becomes "1" and the data at the applicable address in the external memory 19 is read.

Suppose now that the boundary setting flags 42, 43 and 44 are given "0, 0, 1". In this case, the comparison circuit 31 has "0" at the input B3, "0" at the input B2 and "1" at the input B1. Accordingly, as described for the first embodiment, the boundary separating the internal memory space 101 and the external memory space 102 is the address "1FFFH" (2000H) and the mapping is as shown in FIG. 5B. Here, the internal memory space 101 has a capacity of 8 kilobytes and the external memory space 102 has a capacity of 56 kilobytes. If the CPU 12 accesses with specifying an address smaller than "1FFFH", the judgment signal 25 from the comparison circuit 31 becomes "0" and the data at the applicable address in the internal memory 15 is read; if it accesses with specifying an address larger than "2000H", the judgment signal 25 from the comparison circuit 31 becomes "1" and the data at the applicable address in the external memory 19 is read.

Similarly, the capacity of the internal memory space can be set for a range from 8 kilobytes to 56 kilobytes by changing the values set at the boundary setting flags 42, 43 and 44, as shown in FIG. 6.

The second embodiment with the boundary setting flags 42, 43 and 44 enables arbitrary setting of the boundary between the internal memory space 101 and the external memory space 102 for the range shown in FIG. 6, by changing the values set at such flags through software operation. Thus, the internal memory space 101 or the external memory space 102 may have a larger memory space according to the data amount or program size with keeping their addresses continuous.

Therefore, the present invention provided with a variable boundary address between the internal memory 15 and the external memory 19 enables changing of the region for the internal memory space to that for the external memory space and of the region for the external memory space to that for the internal memory space, which results in practical extension of the memory spaces.

Obviously, many variations and modifications can be made to the above embodiments. It is intended to cover in the appended claims all such variations and modifications within the true scope and spirit of the present invention.

What is claimed is:

1. A microcomputer, comprising:

central processing means;

an internal memory storing programs and data and being accessible by said central processing means:

an external memory connected to said central processing means via an external interface, said external memory being accessible by said central processing means; and memory space judgment means for judging whether an access to a memory by said central processing means is for said internal memory or said external memory, said memory space judgement means comprising:

boundary address change means for changing an address of a boundary separating a memory mapping region for said internal memory and a memory mapping region for said external memory, said boundary address change means including a flag for setting up a boundary address between the internal memory and the external memory based on a command from said central processing means; and comparison means for comparing values from said boundary address change means with a memory address accessed by said central processing means, said comparison means outputting a judgement signal to indicate whether an access is for said internal memory or said external memory, said flag of said boundary address change means having a value changeable by said central processing means through software operation, said boundary address change means changes the boundary address to one of a plurality of settings according to the value at said flag, wherein said comparison means of said memory space judgment means receives as input data three most significant bits of said memory address accessed by said central processing means, (A3, A2, A1), a value (B1) of said boundary address change means, a logical "0" (B2), and a value (B3) defined as the logical product obtained by inverting the value from said flag and a logical value "1", said comparison means performs the operation according to a formula $(A3-B3)2^2$ $(A2-B2)2^1$ $(A1-B1)2^0$, and outputs the judgment signal to instruct accessing of said internal memory when the operation result is negative, and for accessing said external memory when the result is zero or positive.

2. A microcomputer, comprising:

central processing means;

an internal memory storing programs and data and being accessible by said central processing means;

an external memory connected to said central processing means via an external interface, said external memory being accessible by said central processing means; and memory space judgment means for judging whether an access to a memory by said central processing means is for said internal memory or said external memory, said memory space judgement means comprising:

boundary address change means for changing an address of a boundary separating a memory mapping region for said internal memory and a memory mapping region for said external memory, said boundary address change means including a flag for setting up a boundary address between the internal memory and the external memory based on a command from said central processing means; and comparison means for comparing values from said boundary address change means with a memory address accessed by said central processing means, said comparison means outputting a judgement signal to indicate whether an access is for said internal memory or said external memory, said flag of said boundary address change means having a value changable by said central processing means through software operation, said boundary address change means changes the boundary address to one of a plurality of settings according to the value at said flag, wherein said boundary address change means comprises three flags, outputting signals B3, B2, and B1, respectively, whose values are changeable said central processing means through software operation and sets the boundary address to one of seven settings according to the values at said flags, and wherein said comparison means receives as input three most significant bits (A3, A2, A1) of said memory address accessed by said central processing means, and values (B3, B2, B1) from said boundary address change means, said comparison means performing the operation according to a formula $(A3-B3)2^2$ $(A2-B2)2^1$ $(A1-B1)2^0$, and outputting a judgment signal to instruct accessing of said internal memory when the operation result is negative and to instruct accessing of said external memory when the result is zero or positive.

3. A single-chip microcomputer including variable memory boundaries between external and internal memories, comprising:

central processing means;

an internal memory for storing programs and data and being accessible by said central processing means;

an external memory connected to said central processing means via an external interface; and memory space judgment means for judging whether an access to a memory address by said central processing means is for said internal memory or said external memory, said memory space judgment means comprising:

boundary address change means for changing a boundary address separating a memory mapping region between said internal memory and for a memory mapping region said external memory, said boundary address change means including a flag for setting up the boundary address based on a command from said central processing means; and comparison means for comparing values for the boundary address, with a memory address accessed by said central processing means, said comparison means outputting a judgment signal to indicate whether said memory address is for said internal memory or said external memory, said flag having a value changeable by said central processing means through software operation, said boundary address change means changes the boundary address to one of a plurality of settings according to the value at said flag, and wherein said comparison means receives as input data three most significant bits of said memory address (A3, A2, A1), a value (B1) from said boundary address change means, a logical "0" (B2), and a value (B3) defined as the logical product obtained by inverting the value from said flag and the logical value "1", said comparison means performs the operation according to a formula $(A3-B3)2^2 (A2-B2)2^1 (A1-B1)2^0$, and outputs the judgment signal to instruct accessing of said internal memory when said operation result is negative, and for accessing of said external memory when the result is zero or positive.

4. A single-chip microcomputer including variable memory boundaries between external and internal memories, comprising:

central processing means;

an internal memory for storing programs and data and being accessible by said central processing means;

an external memory connected to said central processing means via an external interface; and memory space judgment means for judging whether an access to a memory address by said central processing means is for said internal memory or said external memory, said memory space judgment means comprising:

boundary address change means for changing a boundary address separating a memory mapping region between said internal memory and for a memory mapping region said external memory, said boundary address change means including a flag for setting up the boundary address based on a command from said central processing means; and comparison means for comparing values for the boundary address, with a memory address accessed by said central processing means, said comparison means outputting a judgment signal to indicate whether said memory address is for said internal memory or said external memory, said flag having a value changeable by said central processing means through software operation, said boundary address change means changes the boundary address to one of a plurality of settings according to the value at said flag, wherein said boundary address change means comprises three flags having values changeable by said central processing means through software operation and sets the boundary address to one of seven settings according to the values at said flags, and wherein said comparison means receives as inputs three most significant bits (A3, A2, A1) of said memory address and values (B3, B2, B1) from said boundary address change means, said comparison means performs the operation according to a formula $(A3-B3)2^2 (A2-B2)2^1 (A1-B1)2^0$, and outputs the judgment signal to instruct accessing of said internal memory when an operation result is negative, and to instruct accessing of said external memory when the result is zero or positive.

5. A single-chip microcomputer including variable memory boundaries between first and second memories, comprising:

central processing means;

a first memory for storing programs and data and being accessible by said central processing means;

a second memory connected to said central processing means and being accessible by said central processing means; and memory space judgment means for judging whether an access to a memory by said central processing means is for said first memory or said second memory, said memory space judgment means comprising:

boundary address change means for separating a memory mapping region for said first memory and a memory mapping region for said second memory, said boundary address change means including a flag for setting up a boundary address dividing said first memory and said second memory based on a command from said central processing means; and comparison means for performing an operation using the boundary address, and a memory address values accessed by said central processing means, said comparison means outputs a judgment signal to indicate whether an access is for said first memory or the second memory, said flag having a value changeable by said central processing means through software operation, said boundary address change means changes the boundary address to one of a plurality of settings according to said flag, wherein said comparison means receives as input data three most significant bits of address data (A3, A2, A1), a value (B1) of said boundary address change means, a logical "0" (B2), and a value (B3) defined as the logical product obtained by inverting the value from said flag and the logical value "1", said comparison means performs the operation according to a formula $(A3-B3)2^2 (A2-B2)2^1 (A1-B1)2^0$, and outputs the judgment signal to instruct accessing of said first memory when the operation result is negative, and for accessing of said second memory when the result is zero or positive.

6. A single-chip microcomputer including variable memory boundaries between first and second memories, comprising:

central processing means:

a first memory for storing programs and data and being accessible by said central processing means;

a second memory connected to said central processing means and being accessible by said central processing means; and memory space judgment means for judging whether an access to a memory by said central processing means is for said first memory or said second memory, said memory space judgment means comprising:

boundary address change means for separating a memory mapping region for said first memory and a memory mapping region for said second memory, said boundary address change means including a flag for setting up a boundary address dividing said first memory and said second memory based on a command from said central processing means; and comparison means for performing an operation using the boundary address, and a memory address values accessed by said central processing means, said comparison means outputs a judgment signal to indicate whether an access is for said first memory or the second memory, said flag having a value changeable by said central processing means through software operation, said boundary address change means changes the boundary address to one of a plurality of settings according to said flag, wherein said address change means comprises three flags having values changable by said central processing means through software operation and sets said boundary address to one of seven settings according to the value at said flags, and wherein said boundary comparison means receives as inputs the three most significant bits (A3, A2, A1) of said memory address values and the values (B3, B2, B1) from said boundary address change means, said comparison means performs the operation according to a formula $(A3-B3)2^2$ $(A2-B2)2^1$ $(A1-B1)2^0$, and outputs the judgment signal to instruct accessing of said first memory when the operation result is negative and to instruct accessing of said second memory when the result is zero or positive.

* * * * *